(12) United States Patent
Hitt (10) Patent No.: US 7,096,206 B2
(45) Date of Patent: Aug. 22, 2006

(54) HEURISTIC METHOD OF CLASSIFICATION

(75) Inventor: Ben Hitt, Severn, MD (US)

(73) Assignee: Correlogic Systems, Inc., Bethesda, MD (US)

( * ) Notice: Subject to any disclaimer, the term of this patent is extended or adjusted under 35 U.S.C. 154(b) by 611 days.

(21) Appl. No.: 09/883,196

(22) Filed: Jun. 19, 2001

(65) Prior Publication Data

US 2002/0046198 A1 Apr. 18, 2002

Related U.S. Application Data (60) Provisional application No. 60/212,404, filed on Jun. 19, 2000.

(51) Int. Cl.
*G06F 15/18* (2006.01)

(52) U.S. Cl. ............................. 706/12; 706/13; 706/932
(58) Field of Classification Search ................ 706/12, 706/13, 932

See application file for complete search history.

(56) References Cited

U.S. PATENT DOCUMENTS

| 4,122,343 | A | 10/1978 | Risby et al. |
|---|---|---|---|
| 4,697,242 | A | 9/1987 | Holland et al. |
| 4,881,178 | A | 11/1989 | Holland et al. |
| 5,136,686 | A | 8/1992 | Koza |
| 5,352,613 | A | 10/1994 | Tafas |
| 5,649,030 | A | 7/1997 | Normile |
| 5,687,716 | A | 11/1997 | Kaufmann et al. |
| 5,697,369 | A | 12/1997 | Long, Jr. et al. |
| 5,716,825 | A | 2/1998 | Hancock et al. |
| 5,790,761 | A | 8/1998 | Heseltine et al. |
| 5,839,438 | A | 11/1998 | Graettinger et al. |
| 5,905,258 | A | 5/1999 | Clemmer et al. |
| 5,946,640 | A | 8/1999 | Goodacre et al. |
| 5,974,412 | A | 10/1999 | Hazlehurst |
| 6,025,128 | A | 2/2000 | Veltri et al. |
| 6,081,797 | A | 6/2000 | Hittt |
| 6,128,608 | A | 10/2000 | Barnhill |
| 6,157,921 | A | 12/2000 | Barnhill |
| 6,295,514 | B1 | 9/2001 | Agrafiotis et al. |
| 6,329,652 | B1 | 12/2001 | Windig et al. |
| 6,427,141 | B1 | 7/2002 | Barnhill |
| 6,558,902 | B1 | 5/2003 | Hillenkamp |
| 6,571,227 | B1 | 5/2003 | Agrafiotis et al. |
| 6,615,199 | B1 * | 9/2003 | Bowman-Amuah .......... 706/50 |
| 6,675,104 | B1 | 1/2004 | Paulse et al. |

(Continued)

FOREIGN PATENT DOCUMENTS

| WO | WO 93/05478 A1 | 3/1993 |
|---|---|---|
| WO | WO 99/41612 | 8/1999 |

(Continued)

OTHER PUBLICATIONS

Microsoft Press, Computer Dictionary, Microsoft Press, 1994, p. 87.*

(Continued)

*Primary Examiner*—Joseph P. Hirl (57) ABSTRACT

The invention concerns heuristic algorithms for the classification of Objects. A first learning algorithm comprises a genetic algorithm that is used to abstract a data stream associated with each Object and a pattern recognition algorithm that is used to classify the Objects and measure the fitness of the chromosomes of the genetic algorithm. The learning algorithm is applied to a training data set. The learning algorithm generates a classifying algorithm, which is used to classify or categorize unknown Objects. The invention is useful in the areas of classifying texts and medical samples, predicting the behavior of one financial market based on price changes in others and in monitoring the state of complex process facilities to detect impending failures.

10 Claims, 1 Drawing Sheet

U.S. PATENT DOCUMENTS

| | | |
|---|---|---|
| 2002/0046198 A1 | 4/2002 | Hitt |
| 2002/0138208 A1 | 9/2002 | Paulse |
| 2002/0193950 A1 | 12/2002 | Gavin et al. |
| 2003/0004402 A1 | 1/2003 | Hitt et al. |
| 2003/0054367 A1 | 3/2003 | Rich et al. |
| 2003/0077616 A1 | 4/2003 | Lomas |
| 2003/0134304 A1 | 7/2003 | van der Greef |

FOREIGN PATENT DOCUMENTS

| | | |
|---|---|---|
| WO | WO 99/47925 A2 | 9/1999 |
| WO | WO 99/58972 A1 | 11/1999 |
| WO | WO 00/49410 A3 | 8/2000 |
| WO | WO 00/55628 A1 | 9/2000 |
| WO | WO 01/20043 A1 | 3/2001 |
| WO | WO 01/20043 * | 3/2001 |
| WO | WO 01/31579 A2 | 5/2001 |
| WO | WO 01/31580 A2 | 5/2001 |
| WO | WO 01/84140 A2 | 11/2001 |
| WO | WO 02/06829 A2 | 1/2002 |
| WO | WO 02/059822 A2 | 8/2002 |
| WO | WO 02/088744 A2 | 11/2002 |
| WO | WO 03/031031 A1 | 4/2003 |

OTHER PUBLICATIONS

Microsoft Press, Computer Dictionary, Microsoft Press, 408.*

Gaskell, "Electrospray: Principles and Practice," *Journal of Mass Spectrometry*, vol. 32, pp. 677–688 (1997), John Wiley & Sons, Ltd.

Lewis, "An Introduction to Classification and Regression Tree (CART) Analysis," presented at 2000 Annual Meeting of the Society for Academic Emergency Medicine in San Francisco, California, pp. 1–14, 2000.

Hess et al., "Classification and Regression Tree Analysis of 1000 Consecutive Patients with Unknown Primary Carcinoma," *Clinical Cancer Research*, vol. 5, pp. 3403–3410, Nov. 1999.

Schroll et al., "Application of Artificial Intelligence for Chemical Inference, III. Aliphatic Ethers Diagnosed by Their Low–Resolution Mass Spectra and Nuclear Magnetic Resonance Data," *Journal of the American Chemical Society*, Dec. 17, 1969, pp. 7440–7445.

Crawford et al., "Computer Methods in Analytical Mass Spectrometry; Empirical Identification of Molecular Class," 6 pages, 1968.

Jurs et al., "Computerized Learning Machines Applied to Chemical Problems; Molecular Formula Determination from Low Resolution Mass Spectrometry," *Analytical Chemistry*, vol. 41, No. 1; Jan. 1969, pp. 21–27.

Meuzelaar et al., "A Technique for Fast and Reproducible Fingerprinting of Bacteria by Pyrolysis Mass Spectrometry," *Analytical Chemistry*, vol. 45, No. 3, Mar. 1973, pp. 587–590.

"Constraints on "Learning Machine" Classification Methods," *Analytical Chemistry*, vol. 48, No. 14, Dec. 1976, pp. 2265–2268, Gray, N.A.B.

Lowry et al., "Comparison of Various K–Nearest Neighbor Voting Schemes with the Self–Training Interpretive and Retrieval System for Identifying Molecular Substructures from Mass Spectral Data," *Analytical Chemistry*, vol. 49, No. 12, Oct. 1977, pp. 1720–1722.

Macfie et al., "Use of Canonical Variates Analysis in Differentiation of Bacteria by Pyrolysis Gas–Liquid Chromatography," *Journal of General Microbiology* (1978), 104, pp. 67–74, Great Britain.

Atkinson et al., "Statisical Techniques for Diagnosing CIN Using Fluorescence Spectroscopy: SVD and CART," *Journal of Cellular Biochemistry*, Supplement 23, pp. 125–130 (1995).

Dzeroski et al., "Diterpene Structure Elucidation from $^{13}$C NMR–Spectra with Machine Learning," *Intelligent Data Analysis in Medicine and Pharmacology*, pp. 207–225, Kluwer Academic Publishers, 1997.

Voorhees et al., "Approaches to Pyrolysis/Mass Spectrometry Data Analysis of Biological Materials," *Computer-Enhanced Analytical Spectroscopy*, vol. 2, pp. 259–275, Plenum Press, New York, 1990.

Reibnegger et al., "Neural networks as a tool for utilizing laboratory information: Comparison with linear discriminant analysis and with classification and regression trees," *Proc. Natl. Acad. Sci. USA*, vol. 88, pp. 11426–11430, Dec. 1991.

Jellum et al., "Mass Spectrometry in Diagnosis of Metabolic Disorders," *Biomedical and Environmental Mass Spectrometry*, vol. 16, pp. 57–62 (1988).

Wythoff et al., "Spectral Peak Verification and Recognition Using a Multilayered Neural Network," *Analytic Chemistry*, vol. 62, No. 24, pp. 2702–2709, Dec. 15, 1990.

Meyer et al., "Identification of the $^1$H–NMR Spectra of Complex Oligosaccharides with Artificial Neural Networks," *Science*, vol. 251, pp. 542–544, Feb. 1991.

Furlong et al., "Neural Network Analysis of Serial Cardiac Enzyme Data; A Clinical Application of Artificial Machine Intelligence," A.J.C.P., vol. 96, No. 1, pp. 134–141, Jul., 1991.

Cicchetti, "Neural Networks and Diagnosis in the Clinical Laboratory: State of the Art," *Clinical Chemistry*, vol. 38, No. 1, pp. 9–10 (1992).

Ashfaq et al., "Evaluation of PAPNET™ System for Rescreening of Negative Cervical Smears," *Diagnostic Cytopathology*, vol. 13, No. 1, pp. 31–36, 1995.

Malins et al., "Models of DNA structure achieve almost perfect discrimination between normal prostrate, benign prostatic hyperplasia (BPH), and adenocarcinoma and have a high potential for predicting BPH and prostrate cancer," *Proc. Natl. Acad. Sci. USA*, vol. 94, pp. 259–264, Jan. 1997.

Ricketts et al., "Towards the Automated Prescreening of Cervical Smears," 4 pages, Mar. 11, 1992.

Kohno et al., "Quantitative Analysis of Scintiscan Matrices by Computer," *Japanese Journal of Medical Electronics and Biological Engineering*, pp. 22–29, Aug. 1974, English Abstract.

Salford Systems, "Salford Systems White Paper Series," 17 pages, 2000.

Berikov et al., "Regression trees for analysis of mutational spectra in nucleotide sequences," *Bioinformatics*. vol. 15, Nos. 7/8, 1999, pp. 553–562.

Breiman et al., *Classification and Regression Trees*, pp. 174–265, Chapman & Hall/CRC, 1998.

Halket et al., "Deconvolution Gas Chromatography/Mass Spectrometry of Urinary Organic Acids—Potential for Pattern Recognition and Automated Identification of Metabolic Disorders," *Rapid Communications in Mass Spectrometry*, vol. 13, pp. 279–284 (1999).

Eghbaldar et al., "Identification of Structural Features from Mass Spectrometry Using a Neural Network Approach: Application to Trimethylsilyl Derivatives Used for Medical Diagnosis," *J. Chem. Inf. Comput. Sci.*, vol. 36, No. 4, 1996, pp. 637–643.

Babaian, et al., "Performance of a Neural Network in Detecting Prostate Cancer in the Prostate–Specific Antigen Reflex Range of 2.5 to 4.0 ng/ml," *Urology*, vol. 56(6), 2000, pp. 1000–1006.

Tong et al., "Mass Spectral Search method using the Neural Network approach," *International Joint Conference on Neural Networks*, Washington, DC Jul. 10–16, 1999, Proceedings, vol. 6 of 6, pp. 3962–3967.

Tong et al., "Mass spectral search method using the neural network approach," *Chemometrics and Intelligent Laboratory Systems*, vol. 49 (1999), pp. 135–150.

Hashemi et al., "Identifying and Testing of Signatures for Non–Volatile Biomolecules Using Tandem Mass Spectra," *SIGBIO Newsletter*, vol. 15, No. 3, pp. 11–19, Dec. 1995.

Belic et al., "Neural network methodologies for mass spectra recognition," *Vacuum*, vol. 48, No. 7–9, pp. 633–637, 1997.

Werther et al., "Classification of mass spectra; a comparison of yes/no classification methods for the recognition of simple structural properties," *Chemometrics and Intelligent Laboratory Systems*, vol. 22 (1994), pp. 63–76.

Cairns et al., "Towards the Automated Prescreening of Breast X–Rays," 5 pages, Mar. 11, 1992.

Astion et al., "The Application of Backpropagation Neural Networks to Problems in Pathology and Laboratory Medicine," *Arch Pathol Lab Med*, vol. 116, Oct. 1992, pp. 995–1001.

Taylor et. al., "The deconvolution of pyrolysis mass spectra using genetic programming: application to the identification of some *Eubacterium* species," *FEMS Microbiology Letters* 160 (1998) pp. 237–246.

Goodacre et al., "Discrimination between methicillin–resistant and methicillin–susceptible *Staphylococcus aureus* using pyrolysis mass spectrometry and artificial neural networks," *Journal of Antimicrobial Chemotherapy*, vol. 41, pp. 27–34 (1998).

Chun et al., "Long–term Identification of Streptomycetes Using Pyrdysis Mass Spectrometry and Artificial Neural Networks," *Zbl. Bakt.* 285, pp. 258–266 (1997).

Kenyon et al., "Application of Neural Networks to the Analysis of Pyrolysis Mass Spectra," *Zbl. Bakt.* 285, pp. 267–277 (1997).

Nilsson et al., "Classification of Species in the Genus *Penicillium* by Curie Point Pyrolysis/Mass Spectrometry Followed by Multivariate Analysis and Artificial Neural Networks," *Journal of Mass Spectrometry*, vol. 31, pp. 1422–1428 (1996).

Goodacre et al., "Sub–species Discrimination, Using Pyrolysis Mass Spectrometry and Self–organising Neural Networks, of *Propionibacterium acnes* Isolated from Normal Human Skin," *Zbl. Bakt.* 284, pp. 501–515 (1996).

Goodacre et al., "Quantitative Analysis of Multivariate Data Using Artificial Neural Networks: A Tutorial Review and Applications to the Deconvolution of Pyrolysis Mass Spectra," *Zbl. Bakt.* 284 pp. 516–539 (1996).

Goodacre et al., "Identification and Discrimination of Oral Asaccharolytic *Eubacterium* spp. by Pyrolysis Mass Spectrometry and Artificial Neural Networks," *Current Microbiology*, vol. 32, pp. 77–84, (1996).

Goodacre et al., "Correction of Mass Spectral Drift Using Artificial Neural Networks," *Anal. Chem.*, (1996), vol. 68, pp. 271–280.

Freeman et al., "Resolution of batch variations in pyrolysis mass spectrometry of bacteria by the use of artificial neural network analysis," *Antonie van Leeuwenhoek* vol. 68, pp. 253–260, (1995), Kluwer Academic Publishers, The Netherlands.

Chace et al., "Laboratory integration and utilization of tandem mass spectrometry in neonatal screening: a model for clinical mass spectrometry in the next millennium," *Acta Paediatr. Suppl.* 432, pp. 45–47 (1999).

Curry et al., "MSnet: A Neural Network That Classifies Mass Spectra," 32 pages, (1990).

Shaw et al., "Infrared Spectroscopy of Exfoliated Cervical Cell Specimens," *Analytical and Quantitative Cytology and Histology*, vol. 21, No. 4, Aug. 1999, pp. 292–302.

Belic, "Neural Networks Methodologies for Mass Spectra Recognition," pp. 375–380.

Prior et al., "Potential of Urinary Neopterin Excretion in Differentiating Chronic Non–A, Non–B Hepatitis from Fatty Liver," *The Lancet*, Nov. 28, 1987, pp. 1235–1237.

Yates, III, "Mass Spectrometry and the Age of the Proteome," *Journal of Mass Spectrometry*, vol. 33, pp. 1–19 (1998).

Hausen et al., "Determination of Neopterine in Human Urine by Reversed–Phase High–Performance Liquid Chromatography," *Journal of Chromatography*, vol. 227, pp. 61–70 (1982).

Shevchenko et al., "MALDI Quadupole Time–of–Flight Mass Spectrometry: A Powerful Tool for Proteomic Research," *Anaytical Chemistry*, vol. 72, No. 9, pp. 2132–2141, May 1, 2000.

Dudoit et al., "Comparison of Discrimination Methods for the Classification of Tumors Using Gene Expression Data," 43 pages, Jun. 2000.

Dudoit at al., "Comparison of discrimination methods for the classification of tumors using gene expression data," UC Berkeley, Mar. 7, 2000, pp. 1–51.

Nikulin et al., "Near–optimal region selection for feature space reduction: novel preprocessing methods for classifying MR spectra," *NMR Biomedicine*, vol. 11, pp. 209–216 (1998).

Alaiya et al., "Classification of Human Ovarian Tumors Using Multivariate Data Analysis of Polypeptide Expression Patterns," *Int. J. Cancer*, vol. 86, pp. 731–736 (2000).

Bailey–Kellogg et al., "Reducing Mass Degeneracy in SAR by MS by Stable Isotopic Labeling," *Journal of Computational Biology*, vol. 8, No. 1, pp. 19–36 (2001).

Caprioli et al., "Molecular Imaging of Biological Samples: Localization of Peptides and Proteins Using MALDI–TOF MS," *Analytical Chemistry*, vol. 69, No. 23, pp. 4751–4760, Dec. 1,1997.

George, "A Visualization and Design Tool (AVID) for Data Mining with the Self–Organizing Feature Map," *International Journal on Artificial Intelligence Tools*, vol. 9, No. 3, pp. 369–375, (2000).

Kohavi, et al., "Wrappers for feature subset selection," *Artificial Intelligence*, vol. 97, pp. 273–324, (1997).

Marvin et al., "Characterization of a novel *Sepia officinalis* neuropeptide using MALDI–TOL MS and post–source decay analysis," *Peptides*, vol. 22, pp. 1391–1396, (2001).

Oh et al., "A database of protein expression in lung cancer," *Proteomics*, vol. 1, pp. 1303–1319, (2001).

Strouthopoulos et al., "PLA using RLSA and an neural network," *Engineering Applications of Artificial Intelligence,* vol. 12, pp. 119–138, (1999).

Taylor et al., "The deconvolution of pyrolysis mass spectra using genetic programming: application to the identification of some *Eubacterium* species," *FEMS Microbiology Letters,* vol. 160, pp. 237–246, (1998).

Zhang, "Combining Multiple Biomarkers in Clinical Diagnostics—A Review of Methods and Issues," 14 pages, (2002).

Dhar et al., Seven Methods for Transforming Corporate Data Into Business Intelligence, Prentice Hall, pp. 52–76, (1997).

Reed, "Trends in Commerical Bioinformatics," Oscar Gruss Biotechnology Review, Mar. 2000, 20 pages.

Loging, TW et al., "Identifying Potential Tumor Markers and Antigens by Database Mining and Rapid Expression Screening," Genome Research, 10(9):1393–402 (Sep. 2000).

Krishnamurthy, T. et al. "Dectection of Pathogenic and Non–Pathogenic Bacteria by Matrix–assisted Laser Desorption.Ionization Time–of–flight Mass Spectrometry," Rapid Comms. in Mass Spectrometry, vol. 10, 883–888 (1996).

Adam, B–L et al., "Serum Protien Fingerprinting Coupled with a Pattern–matching Algorithm Distinguishes Prostate Cancer from Benign Prostate Hyperplasia and Healthy Men," Cancer Research 62, 3609–3614 (Jul. 1, 2002).

Li, J. et al. "Proteomics and Bioinformatics Approaches for Identification of Serum Biomarkers to Detect Breast Cancer," Clinical Chemistry 48:8, 1296–1304 (2002).

Petricion III, E.F. et al., "Use of proteomic patterns in serum to identify ovarian cancer," The Lancet, vol. 359, 572–577 (Feb. 16, 2002).

Brown, M.P.S. et al. "Knowledge–based analysis of microarray gene expression data by using support vector machines," PNAS vol. 97, No. 1, pp. 262–267 (Jan. 4, 2000).

Kiem, H. & Phue, D, "Using Rough Genetic and Kohonen's Neural Network for Conceptual Cluster Discovery in Data Mining," New Directions in Rough Sets, Data Mining and Granular–Soft Computing. International Workshop, RSFDGRC Proceedings, pp. 448–452 (Nov. 9, 1999).

Chang, E.I et al., "Using Genetic Algorithms to Select and Create Features for Pattern Classification," IJCNN International Joint Conf. on Neural Networks, pp. III–747 to III–752 (Jan. 8, 1991).

Rosty C. et al., "Identification of Hepatocarcinoma–Intestine–Pancreas/Pancreatitis–associated Protein I as a Biomarker for Pancreatic Ductal Adenocarcinoma by Protein Biochip Technology," Cancer Research 62:1868–75 (Mar. 15, 2002).

Claydon, M.A., "The rapid identification of intact microorganisms using mass spectrometry," Nature Biotech. 14:1584–1586 (Nov. 1996).

Bittl, J.A., "From Confusion to Clarify: Direct Thrombin Inhibitors for Patients with Heparin–Induced Thrombocytopenia," Cath. and Cardio. Interventions 52:473–475 (2001).

Paweletz, C.P., Rapid Protein Display Profiling of Cancer Progression Directly from Human Tissue Using a Protein Biochip, Drug Development Research 49:34–42 (2000).

Ciphergen European Update, 1:1–4 (2001).

Kohonen, T. Self Organizing Maps (Springer 2001), pp. 1–70.

Jun Zhang, *Dynamics and Formation of Self–Organizing Maps,* in "Self–Organizing Map Formation: Foundations of Neural Computation," pp. 55–67 (Klaus Obermayer & Terrence J. Sejnowski eds.).

Kohonen, T. "Self–Organization and Associative Memory" (Springer 1988), pp. 30–67.

Holland, J.H., "Adaption in Natural and Artificial Systems: An Introductory Analysis with Applications to Biology, Control, and Artificial Intelligence" (MIT Press 2001), pp. 1–31; 89–119.

Claydon et al. "The Rapid Identification of Intact Microorganisms Using Mass Spectrometry," Nat. Biotechnol. Nov. 1996, Abstract (1 page).

Yao et al. "Evolving Artificial Neural Networks for Medicia Applications." Proc. of the First Korea–Australia Joint Workshop on Evolutionary Computation, Sep. 1995, pp. 1–16.

Goodacre et al. "Rapid Identification of Urinary Tract Infection Bacteria using Hyperspectral Whole–Organism Fingerprinting and Artificial Neural Networks," Microbiology, vol. 144, 1998, pp. 1157–1170.

Pei et al. "Feature Extraction Using Genetic Algorithms," Proceedings of the First International Symposium on Intelligent Data Engineering and Learning, IDEAL '98, Springer, Hong Kong, Oct. 1998, pp. 371–384.

Jain et al. "Statistical Pattern Recognition: A Review," IEEE Trans. on Pattern Analysis and Machine Intelligence, vol. 22, No. 1, Jan. 2000, pp. 4–37.

Hackett et al. "Rapid SELDI Biomarker Protien Profiling of Serum from Normal and Prostate Cancer Patients," American Ass'n for Cancer Research, vol. 41, Mar. 2000 (Abstract only), pp. 563–564.

Lockhart, D.J., et al., Nature Jun. 15, 2000, vol. 405 pp. 827–836.

Roses, A.D. Nature Jun. 15, 2000 pp. 857–865.

Moler, E.J. et al. Physiol Genomics Dec., 2000, vol. 4 pp. 109–126.

Liotta et al. Nature Genetics, Oct. 1, 2000, vol. 1 pp. 48–56.

\* cited by examiner

FIG. 1

HEURISTIC METHOD OF CLASSIFICATION

This application claims benefit under 35 U.S.C. sec. 119(e)(1) of the priority of application Serial No. 60/212,404, filed Jun. 19, 2000, which is hereby incorporated by reference in its entirety.

FIELD OF THE INVENTION

The field of the invention concerns a method of analyzing and classifying objects which can be represented as character strings, such as documents, or strings or tables of numerical data, such as changes in stock market prices, the levels of expression of different genes in cells of a tissue detected by hybridization of mRNA to a gene chip, or the amounts of different proteins in a sample detected by mass spectroscopy. More specifically, the invention concerns a general method whereby a classification algorithm is generated and verified from a leaning data set consisting of pre-classified examples of the class of objects that are to be classified. The pre-classified examples having been classified by reading in the case of documents, historical experience in the case of market data, or pathological examination in the case of biological data. The classification algorithm can then be used to classify previously unclassified examples. Such algorithms are generically termed data mining techniques. The more commonly applied data mining techniques, such as multivariate linear regression and non linear feed-forward neural networks have an intrinsic shortcoming, in that, once developed, they are static and cannot recognize novel events in a data stream. The end result is that novel events often get misclassified. The invention concerns a solution to this shortcoming through an adaptive mechanism that can recognize novel events in a data stream.

BACKGROUND OF THE INVENTION

The invention uses genetic algorithms and self organizing adaptive pattern recognition algorithms. Genetic algorithms were described initially by Professor John H. Holland. (J. H. Holland, *Adaptation in Natural and Artificial Systems*, MIT Press 1992, see also U.S. Pat. No. 4,697,242 and No. 4,881,178). A use of a genetic algorithm for pattern recognition is described in U.S. Pat. No. 5,136,686 to Koza, see column 87.

Self organizing pattern recognition has been described by Kohonen. (T. Kohonen, *Self Organizing and Associative Memory, 8 Series in Information Sciences*, Springer Verlag, 1984; Kohonen, T, *Self-organizing Maps*, Springer Verlag, Heidelberg 1997 ). The use of self organizing maps in adaptive pattern recognition was described by Dr. Richard Lippman of the Massachusetts Institute of Technology.

SUMMARY OF THE INVENTION

The invention consists of two related heuristic algorithms, a classifying algorithm and a learning algorithm, which are used to implement classifying methods and learning methods. The parameters of the classifying algorithm are determined by the application of the learning algorithm to a training or learning data set. The training data set is a data set in which each item has already been classified. Although the following method is described without reference to digital computers, it will be understood by those skilled in the art that the invention is intended for implementation as computer software. Any general purpose computer can be used; the calculations according to the method are not unduly extensive. While computers having parallel processing facility could be used for the invention, such processing capabilities are not necessary for the practical use of the learning algorithm of the invention. The classifying algorithm requires only a minimal amount of computation.

The classifying method of the invention classifies Objects according to a data stream that is associated with the Object. Each Object in the invention is characterized by a data stream, which is a large number, at least about 100 data points, and can be 10,000 or more data points. A data stream is generated in a way that allows for the individual datum in data streams of different samples of the same type of Object to be correlated one with the other.

Examples of Objects include texts, points in time in the context of predicting the direction of financial markets or the behavior of a complex processing facility, and biological samples for medical diagnosis. The associated data streams of these Objects are the distribution of trigrams in the text, the daily changes in price of publicly traded stocks or commodities, the instantaneous readings of a number of pressure, temperature and flow readings in the processing facility such as an oil refinery, and a mass spectrum of some subset of the proteins found in the sample, or the intensity mRNA hybridization to an array of different test polynucleotides.

Thus, generically the invention can be used whenever it is desired to classify Objects into one of several categories, e.g., which typically is two or three categories, and the Objects are associated with extensive amounts of data, e.g., typically thousands of data points. The term "Objects" is capitalized herein to indicate that Objects has a special meaning herein in that it refers collectively to tangible objects, e.g., specific samples, and intangible objects, e.g., writings or texts, and totally abstract objects, e.g., the moment in time prior to an untoward event in a complex processing facility or the movement in the price of a foreign currency.

The first step of the classifying method is to calculate an Object vector, i.e., an ordered set of a small number of data points or scalers (between 4 and 100, more typically between 5 and 30) that is derived from the data stream associated with the Object to be classified. The transformation of the data steam into an Object vector is termed "abstraction." The most simple abstraction process is to select a number of points of the data stream. However, in principle the abstraction process can be performed on any function of the data stream. In the embodiments presented below abstraction is performed by selection of a small number of specific intensities from the data stream.

In one embodiment, the second step of the classifying method is to determine in which data cluster, if any, the vector rests. Data clusters are mathematical constructs that are the multidimensional equivalents of non-overlapping "hyperspheres" of fixed size in the vector space. The location and associated classification or "status" of each data cluster is determined by the learning algorithm from the training data set. The extent or size of each data cluster and the number of dimensions of the vector space is set as a matter of routine experimentation by the operator prior to the operation of the learning algorithm. If the vector lies within a known data cluster, the Object is given the classification associated with that cluster. In the most simple embodiments the number of dimensions of the vector space is equal to the number of data points that is selected in the abstraction process. Alternatively, however, each scaler of the Object vector can be calculated using multiple data points of the data stream. If the Object vector rests outside of any known cluster, a classification can be made of atypia, or atypical sample.

In an alternative embodiment, the definition of each data cluster as a hypersphere is discarded and the second step is performed by calculating the match parameter $\rho=\Sigma(\min(|I_i|, |W_i|))/\Sigma(|W_i|)$, where $I_i$ are the scalers of the Object vector and $W_i$ are the scalers of the centroid of the preformed classifying vector. The match parameter $\rho$ is also termed a normalized "fuzzy" AND. The Object is then classified according to the classification of the preformed vector to which it is most similar by this metric. The match parameter is 1 when the Object vector and the preformed vector are identical and less than 1 in all other cases.

The learning algorithm determines both the details of abstraction process and the identity of the data clusters by utilizing a combination of known mathematical techniques and two pre-set parameters. A user pre-sets the number of dimensions of the vector space and the size of the data clusters or, alternatively, the minimum acceptable level of the "fuzzy AND" match parameter $\rho$. As used herein the term "data cluster" refers to both a hypersphere using a Euclidean metric and preformed classified vectors using a "fuzzy AND" metric.

Typically the vector space in which the data clusters lie is a normalized vector space so that the variation of intensities in each dimension is constant. So expressed the size of the data cluster using a Euclidean metric can be expressed as minimum percent similarity among the vectors resting within the cluster.

In one embodiment the learning algorithm can be implemented by combining two different types of publicly available generic software, which have been developed by others and are well known in the field: (1) a genetic algorithm (J. H. Holland, *Adaptation in Natural and Artificial Systems*, MIT Press 1992) that processes a set of logical chromosomes[1] to identify an optimal logical chromosome that controls the abstraction of the data steam and (2) an adaptive self-organizing pattern recognition system (see, T. Kohonen, *Self Organizing and Associative Memory, 8 Series in Information Sciences*, Springer Verlag, 1984; Kohonen, T, *Self-organizing Maps*, Springer Verlag, Heidelberg 1997), available from Group One Software, Greenbelt, Md., which identifies a set of data clusters based on any set of vectors generated by a logical chromosome. Specifically the adaptive pattern recognition software maximizes the number of vectors that rest in homogeneous data clusters, i.e., clusters that contain vectors of the learning set having only one classification type.

[1] The term logical chromosome is used in connection with genetic learning algorithms because the logical operations of the algorithm are analogous to reproduction, selection, recombination and mutation. There is, of course, no biological embodiment of a logical chromosome in DNA or otherwise. The genetic learning algorithms of the invention are purely computational devices, and should not be confused with schemes for biologically-based information processing.

To use a genetic algorithm each logical chromosome must be assigned a "fitness." The fitness of each logical chromosome is determined by the number of vectors in the training data set that rest in homogeneous clusters of the optimal set of data clusters for that chromosome. Thus, the learning algorithm of the invention combines a genetic algorithm to identify an optimal logical chromosome and an adaptive pattern recognition algorithm to generate an optimal set of data clusters and a the fitness calculation based on the number of sample vectors resting in homogeneous clusters. In its broadest embodiment, the learning algorithm of the invention consists of the combination of a genetic algorithm, a pattern recognition algorithm and the use of a fitness function that measures the homogeneity of the output of the pattern recognition algorithm to control the genetic algorithm.

To avoid confusion, it should be noted that the number of data clusters is much greater than the number of categories. The classifying algorithms of the examples below sorted Objects into two categories, e.g., documents into those of interest and those not of interest, or the clinical samples into benign or malignant. These classifying algorithms, however, utilize multiple data clusters to perform the classification. When the Object is a point in time, the classifying algorithm may utilize more than two categories. For example, when the invention is used as a predictor of foreign exchange rates, a tripartite scheme corresponding to rising, falling and mixed outlooks would be appropriate. Again, such a tripartite classifying algorithm would be expected to have many more than three data clusters.

DETAILED DESCRIPTION OF THE INVENTION

In order to practice the invention the routine practitioner must develop a classifying algorithm by employing the learning algorithm. As with any heuristic method, some routine experimentation is required. To employ the learning algorithm, the routine practitioner uses a training data set and must experimentally optimize two parameters, the number of dimensions and the data cluster size.

Although there is no absolute or inherent upper limit on the number of dimensions in the vector, the learning algorithm itself inherently limits the number of dimensions in each implementation. If the number of dimensions is too low or the size of the cluster is too large, the learning algorithm fails to generate any logical chromosomes that correctly classify all samples with an acceptable level of homogeneity. Conversely, the number of dimensions can be too large. Under this circumstance, the learning algorithm generates many logical chromosomes that have the maximum possible fitness early in the learning process and, accordingly, there is only abortive selection. Similarly, when the size of the data clusters is too small, the number of clusters will be found to approach the number of samples in the training data set and, again, the routine practitioner will find that a large number of logical chromosomes will yield a set of completely homogeneous data clusters.

Although the foregoing provide general guidance for the selection of the number of dimensions and the data cluster size for a classifying algorithm, it should be understood that the true test of the value of a classifying algorithm is its ability to correctly classify data streams that are independent of the data stream in the training data set. Therefore, the routine practitioner will understand that a portion of the learning data set must be reserved to verify that the classification algorithm is functioning with an error rate, that is acceptable for the intended purpose. The particular components of the invention are described in greater detail below.

Figure 1:
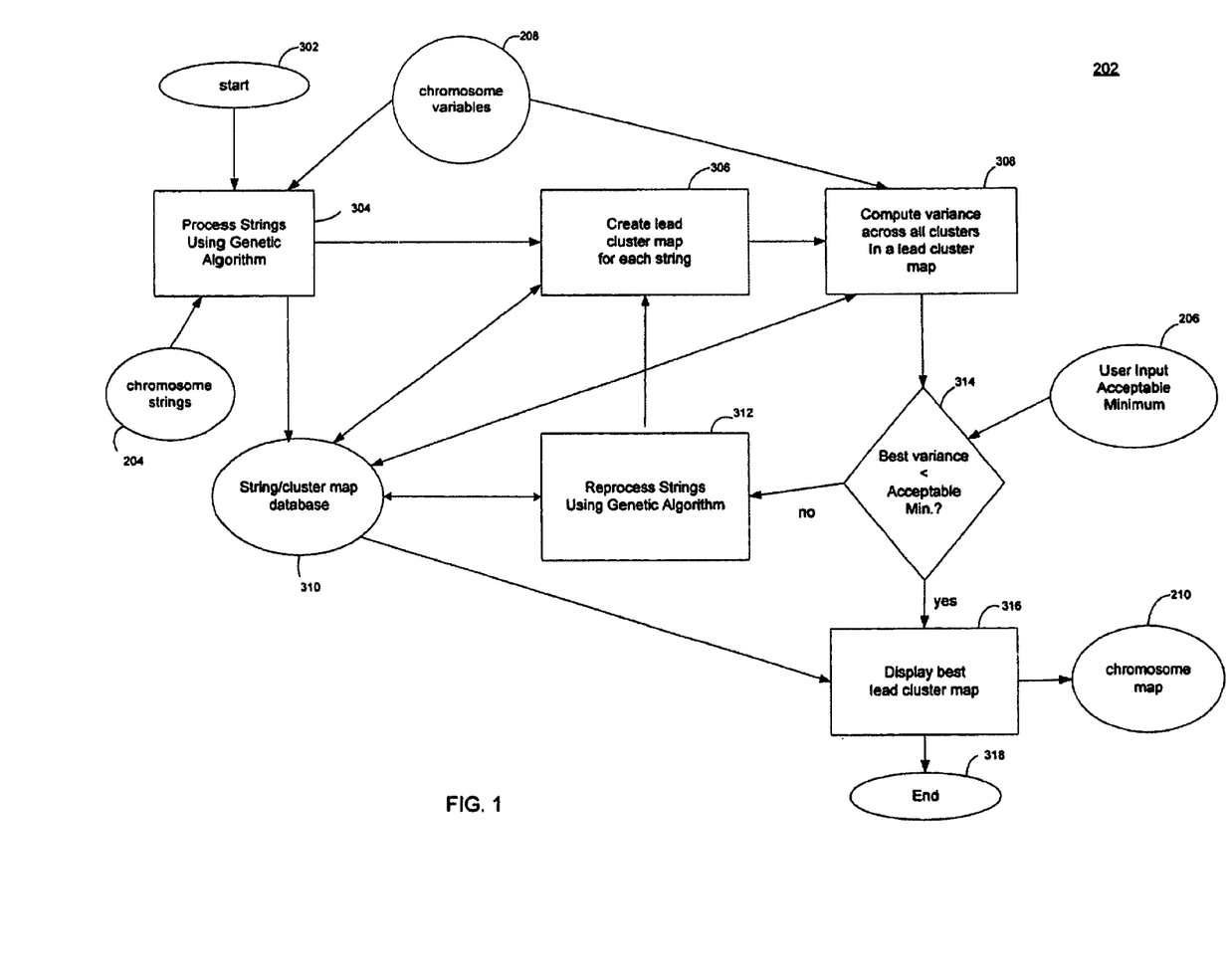
FIG. 1 is a control flow diagram according to one embodiment of the invention.

As discussed above, the first step of the classifying method is to calculate an Object vector, i.e., an ordered set of a small number of data points or scalars (between 4 and 100, more typically between 5 and 30) that is derived from the data stream, FIG. 1, 110 associated with the Object to be classified. The transformation of the data steam into an Object vector is termed "abstraction," FIG. 1, 120. The most simple abstraction process is to select a number of points of the data stream. However, in principle the abstraction process can be performed on any function of the data stream. In the embodiments presented below abstraction is performed by selection of a small number of specific intensities from the data stream.

In one embodiment, the second step of the classifying method is to determine in which data cluster, if any, the vector rests. FIG. 1, 130. Data clusters are mathematical constructs that are the multidimensional equivalents of non-overlapping "hyperspheres" of fixed size in the vector space. The location and associated classification or "status" of each data cluster is determined by the learning algorithm from the training data set. The extent or size of each data cluster and the number of dimensions of the vector space is set as a matter of routine experimentation by the operator prior to the operation of the learning algorithm. If the vector lies within a known data cluster, the Object is given the classification associated with that cluster. FIG. 1, 150. In the most simple embodiments the number of dimensions of the vector space is equal to the number of data points that is selected in the abstraction process. Alternatively, however, each scalar of the Object vector can be calculated using multiple data points of the data stream. If the Object vector rests outside of any known cluster, a classification can be made of atypia, or atypical sample. FIG. 1, 140.

A. The Data Stream and Types of Objects

The classification of Objects and the generation of the associated data stream depend upon the nature of the problem to be addressed. The general principles are illustrated by the following examples.

Documents: In one embodiment the invention provides a method for the computerized classification documents. For example, one may want to extract the documents of interest from a data base consisting of a number of documents too large to review individually. For these circumstances, the invention provides a computerized algorithm to identify a subset of the database most likely to contain the documents of interest. Each document is an Object, the data stream for each document consists of the histogram representing the frequency of each of the 17576 ($26^3$) three letter combinations (trigrams) found in the document after removal of spaces and punctuation. Alternatively, a histogram of the 9261 trigrams of consonants can be prepared after the further removal of vowels from the document. The training data set consists of a sample of the appropriate documents that have been classified as "of interest" or "not of interest," according to the needs of the user.

Financial Markets: It is self-evident that financial markets respond to external events and are interrelated to each other in a consistent fashion; for example, foreign exchange rates are influenced by the attractiveness of investment opportunities. However, the direction and extent of the response to an individual event can be difficult to predict. In one embodiment, the invention provides an algorithm computerized prediction of prices in one market based on the movement in prices in another. Each point in time is an Object, for example hourly intervals, the data stream for hour consists of the histogram of the change in price of publicly traded securities in the major stock markets in the relevant countries, e.g., the New York and London stock exchanges where the exchange rate of the pound and dollar are of interest. The training data set consists of the historical record such price changes that has been classified as preceding a rise or fall in the dollar:pound rate.

Processing Facilities: In a complex processing facility, such as an oil refinery, oil field or petrochemical plant, the pressure, temperature, flow and status of multiple valves and other controls (collectively the "status values") are constantly monitored and recorded. There is a need to detect impending untoward events before the untoward event becomes a catastrophic failure. The present invention provides a computerized algorithm to classify each point in time as either a high-risk or normal-risk time point. The data stream consists of the status values for each point in time. The training data set consists of the historical record of the status values classified as either preceding an untoward event or as preceding normal operation.

Medical Diagnosis: The invention can be used in the analysis of a tissue sample for medical diagnosis, e.g., for analysis of serum or plasma. The data stream can be any reproducible physical analysis of the tissue sample that results in 2,000 or more measurements that can be quantified to at least 1 part per thousand (three significant figures). Time of flight mass spectra of proteins are particularly suitable for the practice of the invention. More specifically, matrix assisted laser desorption ionization time of flight (MALDI-TOF) and surface enhanced laser desorption ionization time of flight (SELDI-TOF) spectroscopy. See generally WO 00/49410.

The data stream can also include measurements that are not inherently organized by a single ordered parameter such as molecular weight, but have an arbitrary order. Thus, DNA microarray data that simultaneously measures the expression levels of 2,000 or more genes can be used as a data stream when the tissue sample is a biopsy specimen, recognizing that the order of the individual genes is the data stream is arbitrary.

Specific diseases where the present invention is particularly valuable occur when early diagnosis is important, but technically difficult because of the absence of symptoms and the disease may be expected to produce differences that are detectable in the serum because of the metabolic activity of the pathological tissue. The early diagnosis of malignancies are a primary focus of the use of the invention. The working example illustrates the diagnosis of prostatic carcinoma, similar trials for the diagnosis of ovarian cancers have been performed.

It should be noted that a single data stream from a patient sample can be analyzed for multiple diagnoses using the method of the invention. The additional cost of such multiple analysis would be trivial because the steps specific to each diagnosis are computational only.

B. The Abstraction Process and Logical Chromosome

The first step in the classifying process of the invention is the transformation or abstraction of the data stream into a characteristic vector. The data may be conveniently normalized prior to abstraction by assigning the overall peak a arbitrary value of 1.0 and all other points given fractional values. The most simple abstraction of a data stream consists of the selection of a small number of data points. Those skilled in the will recognize that more complex functions of multiple points could be constructed such as averages over intervals or more complex sums or differences between data points that are at predetermined distance from a selected prototype data point. Such functions of the intensity values of the data stream could also be used and are expected to function equivalently to the simple abstract illustrated in the working examples.

The skilled will also appreciate that routine experimentation can determine whether abstraction by taking the instantaneous slope at arbitrary points could also function in the present invention. Accordingly, such routinely available variations of the illustrated working examples are within the scope of the invention.

A feature of the invention is the use of a genetic algorithm to determine the data points which are used to calculate the characteristic vector. In keeping with the nomenclature of the art, the list of the specific points to be selected is termed a logical chromosome. The logical chromosomes contain as many "genes" as there are dimensions of the characteristic vector. Any set of the appropriate number of data points can be a logical chromosome, provided only that no gene of a chromosome is duplicated. The order of the genes has no significance to the invention.

Those skilled in the art appreciate that a genetic algorithm can be used when two conditions are met. A particular solution to a problem must be able to be expressed by a set or string of fixed size of discrete elements, which elements can be numbers or characters, and the strings can be recombined to yield further solutions. One must also be able to calculate a numerical value of the relative merit of each solution, its fitness. Under these circumstances the details of the genetic algorithm are unrelated to the problem whose solution is sought. Accordingly, for the present invention, generic genetic algorithm software may be employed. The algorithms in PGAPack libraries, available from Argonne National Laboratory is suitable. The calculation of the fitness of any particular logical chromosome is discussed below.

The first illustrative example concerns a corpus of 100 documents, which were randomly divided into a training set of 46 documents and a testing set of 54 documents. The documents consisted of State of the Union addresses, selections from the book *The Art of War* and articles from the Financial Times. The distribution of trigrams for each document was calculated. A vector space of 25 dimensions and a data cluster size in each dimension of 0.35 times the range of values in that dimension was selected. The genetic algorithms were initialized with about 1,500 randomly chosen logical chromosomes. As the algorithm progressed the more fit logical chromosomes are duplicated and the less fit are terminated. There is recombination between chromosomes and mutation, which occurs by the random replacement of an element of a chromosome. It is not an essential feature of the invention that the initially selected collection of logical chromosome be random. Certain prescreening of the total set of data streams to identify those data points having the highest variability may be useful, although such techniques may also introduce an unwanted initialization bias. Those skilled in the art appreciate that the initial set of chromosomes, the mutation rate and other boundary conditions for the genetic algorithm are not critical to its function.

C. The Pattern Recognition Process and Fitness Score Generation

The fitness score of each of the logical chromosomes that are generated by the genetic algorithm is calculated. The calculation of the fitness score requires an optimal set of data clusters be generated for each logical chromosome that is tested. Data clusters are simply the volumes in the vector space in which the Object vectors of the training data set rest. The method of generating the optimal set of data clusters is not critical to the invention and will be considered below. However, whatever method is used to generate the data cluster map, the map is constrained by the following rules: each data cluster should be located at the centroid of the data points that lie within the data cluster, no two data clusters may overlap and the dimension of each cluster in the normalized vector space is fixed prior to the generation of the map.

The size of the data cluster is set by the user during the training process. Setting the size too large results in a failure find any chromosomes that can successfully classify the entire training set, conversely setting the size to low results in a set of optimal data clusters in which the number of clusters approaches the number of data points in the training set. More importantly, a too small setting of the size of the data cluster results in "overfitting," which is discussed below.

The method used to define the size of the data cluster is a part of the invention. The cluster size can be defined by the maximum of the equivalent of the Euclidean distance (root sum of the squares) between any two members of the data cluster. A data cluster size that corresponds to a requirement of 90% similarity is suitable for the invention when the data stream is generated by SELDI-TOF mass spectroscopy data. Somewhat large data clusters have been found useful for the classification of texts. Mathematically, 90% similarity is defined by requiring that the distance between any two members of a cluster is less than 0.1 of the maximum distance between two points in a normalized vector space. For this calculation, the vector space is normalized so that the range of each scalar of the vectors within the training data set is between 0.0 and 1.0. Thus normalized, the maximal possible distance between any two vectors in the vector space is then root N, where N is the number of dimensions. The Euclidean diameter of each cluster is then $0.1 \times \text{root}(N)$.

The specific normalization of the vector space is not a critical feature of the method. The foregoing method was selected for ease of calculation. Alternative normalization can be accomplished by scaling each dimension not to the range but so that each dimension has an equal variance. Non-Euclidean metrics, such as vector product metrics can be used.

Those skilled in the art will further recognize that the data stream may be converted into logarithmic form if the distribution of values within the data stream is log normal and not normally distributed.

Once the optimal set of data clusters for a logical chromosome has been generated, the fitness score for that chromosome can be calculated. For the present invention, the fitness score of the chromosome roughly corresponds to the number of vectors of the training data set that rest in clusters that are homogeneous, i.e., clusters that contain the characteristic vectors from samples having a single classification. More precisely, the fitness score is calculated by assigning to each cluster a homogeneity score, which varies from 0.0 for homogeneous clusters to 0.5 for clusters that contain equal numbers of malignant and benign sample vectors. The fitness score of the chromosome is the average fitness score of the data clusters. Thus, a fitness score of 0.0 is the most fit. There is a bias towards logical chromosomes that generate more data clusters, in that when two logical chromosomes that have equal numbers of errors in assigning the data, the chromosome that generates the greater number of clusters will have a lower average homogeneity score and thus a better fitness score.

Publicly available software for generating using the self-organizing map is has been given several names, one is a "Lead Cluster Map" and can be implemented by generic software that is available as Model 1 from Group One Software (Greenbelt, Md.).

An alternative embodiment of the invention utilizes a non-Euclidean metric to establish the boundaries of the data clusters. A metric refers to a method of measuring distance in a vector space. The alternative metric for the invention can be based on a normalized "fuzzy AND" as defined above. Soft ware that implements an adaptive pattern recognition algorithm based on the "fuzzy AND" metric is available from Boston University under the name Fuzzy ARTMAP.

D. Description and Verification of Specific Embodiments

Those skilled in the art understand that the assignment of the entire training data set into homogeneous data clusters is not in itself evidence that the classifying algorithm is effectively operating at an acceptable level of accuracy. Thus, the value of the classifying algorithm generated by a learning algorithm must be tested by its ability to sort a set of data other than the training data set. When a learning algorithm generates a classifying algorithm that successfully assigns the training data set but only poorly assigns the test data set, the training data is said to be overfitted by learning algorithm. Overfitting results when the number of dimensions is too large and/or the size of the data clusters is too small.

Document Clustering: Document (text) clustering is of interest to a wide range of professions. These include the legal, medical and intelligence communities. Boolean based search and retrieval methods have proven inadequate when faced with the rigors of the current production volume of textual material. Furthermore, Boolean searches do not capture conceptual information.

A suggested approach to the problem has been to somehow extract conceptual information in a manner that is amenable to numeric analysis. One such method is the coding of a document as a collection of trigrams and their frequency of occurrence recorded. A trigram is a collection of any three characters, such as AFV, KLF, OID, etc. There are therefore $26^3$ trigrams. White space and punctuation are not included. A document can then be represented as segmented into a specific set of trigrams starting from the beginning of the text streaming from that document. The resulting set of trigrams from that document and their frequencies are characteristic. If documents in a set have similar trigram sets and frequencies, it is likely that they concern the same topic. This is particularly true if only specific subset of trigrams are examined and counted. The question is, which set of trigrams are descriptive of any concept. A learning algorithm according to the invention can answer that question.

A corpus of 100 English language documents from the Financial Times, The Art of War and the collection of presidential State of the Union addresses was compiled. The corpus was randomly segmented into training and testing corpi. All documents were assigned a value of either 0 or 1, where 0 indicated undesirable and 1 indicated desirable. The learning algorithm searched through the trigram set and identified a set of trigrams that separated the two classes of documents. The resultant model was in 25 dimensions with the decision boundary set at 0.35 the maximal distance allowed in the space. The classifying algorithm utilizes only 25 of the possible 17,576 trigrams. On testing the results in the table obtained.

TABLE A

Confusion Matrix. Actual values are read vertically and the results of an algorithm according to the invention are read horizontally.

|  | Actual Classification 0 | 1 | Totals |
|---|---|---|---|
| Assigned Classification 0 | 22 | 2 | 24 |
| 1 |  | 6 | 24 | 30 |
| Totals | 28 | 26 | 54 |

The results show that algorithm correctly identified 24 of the 26 documents that were of interest and correctly screened out or rejected 22 of the 26 documents that were not of interest.

Evaluation of Biological States: The above-described learning algorithm was employed to develop a classification for prostatic cancer using SELDI-TOF mass spectra (MS) of 55 patient serum samples, 30 having biopsy diagnosed prostatic cancer and prostatic serum antigen (PSA) levels greater than 4.0 ng/ml and 25 normals having PSA levels below 1 ng/ml. The MS data was abstracted by selection of 7 molecular weight values.

A cluster map that assigned each vector in the training data set to a homogeneous data cluster was generated. The cluster map contained 34 clusters, 17 benign and 17 malignant. Table 1 shows the location of each of data cluster of the map and the number of samples of the training set assigned to each cluster.

The classifying algorithm was tested using 231 samples that were excluded from the training data set. Six sets of samples from patients with various clinical and pathological diagnoses were used. The clinical and pathological description and the algorithm results were as follows: 1) 24 patients with PSA>4 ng/ml and biopsy proven cancer, 22 map to diseased data clusters, 2 map to no cluster; 2) 6 normal, all map to healthy clusters; 3) 39 with benign prostatic hypertrophy (BPH) or prostatitis and PSA<4 ng/ml, 7 map to diseased data clusters, none to healthy data clusters and 32 to no data cluster; 4) 139 with BPH or prostatitis and PSA>4 and <10 ng/ml, 42 map to diseased data clusters, 2 to healthy data clusters and 95 to no data cluster; 5) 19 with BPH or prostatitis and PSA>10 ng/ml, 9 map to diseased data clusters none to healthy and 10 to no data cluster. A sixth set of data was developed by taking pre- and post-prostatectomy samples from patients having biopsy proven carcinoma and PSA>10 ng/ml. As expected each of the 7 pre-surgical samples was assigned to a diseased data set. However, none of the sample taken 6 weeks post surgery, at a time when the PSA levels had fallen to below 1 ng/ml were not assignable to any data set.

When evaluating the results of the foregoing test, it should be recalled that the rate of occult carcinoma in patients having PSA of 4–10 ng/ml and benign biopsy diagnosis is about 30%. Thus, the finding that between 18% and 47% of the patients with elevated PSA, but no tissue diagnosis of cancer, is consistent with that correctly predicts the presence of carcinoma.

I claim:

1. A computer implemented method of constructing a model configured to classify biological samples as being of one of at least a first state or a second state different than the first state, comprising:

providing a plurality of data strings, each data string being derived from a biological sample known to be of the first state or the second state;

using a genetic algorithm to select a first set of variables that identify data in each of the plurality of data strings;

calculating a sample vector for each member of the set of data strings using the first set of variables;

finding a location in a first vector space of each of at least two data clusters that best fit the sample vectors calculated using the first set of variables;

determining a variability for the at least two data clusters that best fit the sample vectors calculated using the first set of variables;

determining whether the variability of the at least two data clusters that best fit the sample vectors calculated using the first set of variables is within an acceptable tolerance;

if it is determined that the variability of the at least two data clusters that best fit the sample vectors calculated using the first set of variables is within the acceptable tolerance, providing the locations in the first vector space of the at least two data clusters that best fit the sample vectors calculated using the first set of variables; and if it is determined that the variability of the at least two data clusters that best fit the sample vectors calculated using the first set of variables is not within the acceptable tolerance, using the genetic algorithm to select a second set of variables different than the first set of variables, calculating a sample vector for each member of the set of data strings using the second set of variables, finding a location in a second vector space of each of at least two data clusters that best fit the sample vectors calculated using the second set of variables, determining a variability for the at least two data clusters that best fit the sample vectors calculated using the second set of variables, determining whether the variability for the at least two data clusters that best fit the sample vectors calculated using the second set of variables is within the acceptable tolerance, and if it is determined that the variability of the at least two data clusters that best fit the sample vectors calculated using the second set of variables is within the acceptable tolerance, providing the locations in the second vector space of the at least two data clusters that best fit the sample vectors calculated using the second set of variables.

2. The computer implemented method of claim 1, wherein the variability of the at least two data clusters that best fit the sample vectors calculated using the first set of variables is the variance of the at least two data clusters that best fit the sample vectors calculated using the first set of variables.

3. The computer implemented method of claim 1, wherein if it is determined that the variability of the at least two data clusters that best fit the sample vectors calculated using the second set of variables is not within the acceptable tolerance, selecting a third set of variables different than the first set of variables and different than the second set of variables.

4. The computer implemented method of claim 1, wherein each data string is derived from a biological sample via a bio-assay technique.

5. The computer implemented method of claim 1, wherein the acceptable tolerance is input by a user.

6. The computer implemented method of claim 1, wherein the finding a location in a first vector space of each of the at least two data clusters that best fit the sample vectors calculated using the first set of variables includes determining for each sample vector a proximity of the sample vector to a preexisting centroid in the first vector space.

7. The computer implemented method of claim 6, further comprising:

determining if the distance of each sample vector from the closest preexisting centroid is within a predetermined threshold distance, if the distance exceeds the threshold difference, defining a new centroid based on the location of the sample vector in the first vector space, and if the distance is less than the threshold difference, assigning the sample vector to a cluster associated with the preexisting centroid.

8. The computer implemented method of claim 7, wherein the assigning the sample vector includes adjusting the location of the preexisting centroid closer to the location of the sample vector.

9. The computer implemented method of claim 1, wherein each of the at least two data clusters that best fit the sample vectors calculated using the first set of variables includes a centroid and a decision hyper-radius.

10. A model configured to classify biological samples constructed using the method of claim 1.

* * * * *